(12) United States Patent
Yamazaki

(10) Patent No.: US 11,999,111 B2
(45) Date of Patent: Jun. 4, 2024

(54) METHOD FOR MANUFACTURING THREE-DIMENSIONAL SHAPED OBJECT, THREE-DIMENSIONAL SHAPING SYSTEM, AND INFORMATION PROCESSING APPARATUS

(71) Applicant: SEIKO EPSON CORPORATION, Tokyo (JP)

(72) Inventor: Satoshi Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/822,258

(22) Filed: Aug. 25, 2022

(65) Prior Publication Data

US 2023/0064999 A1    Mar. 2, 2023

(30) Foreign Application Priority Data

Aug. 27, 2021 (JP) .................. 2021-138674

(51) Int. Cl.
| | | |
|---|---|---|
| *B29C 64/393* | (2017.01) | |
| *B22F 10/22* | (2021.01) | |
| *B22F 10/85* | (2021.01) | |
| *B22F 12/00* | (2021.01) | |
| *B28B 1/00* | (2006.01) | |
| *B28B 17/00* | (2006.01) | |

(Continued)

(52) U.S. Cl.
CPC ............ *B29C 64/393* (2017.08); *B22F 10/22* (2021.01); *B22F 10/85* (2021.01); *B22F 12/00* (2021.01); *B28B 1/001* (2013.01); *B28B 17/0081* (2013.01); *B29C 64/118* (2017.08); *B29C 64/35* (2017.08); *B33Y 10/00* (2014.12); *B33Y 30/00* (2014.12); *B33Y 40/20* (2020.01); *B33Y 50/02* (2014.12)

(58) Field of Classification Search
None
See application file for complete search history.

(56) References Cited

U.S. PATENT DOCUMENTS

| | | |
|---|---|---|
| 9,969,130 B1 | 5/2018 | Lee et al. |
| 2009/0225128 A1* | 9/2009 | Kuroda ................ B41J 2/16579 347/23 |

(Continued)

FOREIGN PATENT DOCUMENTS

| | | | |
|---|---|---|---|
| JP | 2018-075825 A | 5/2018 | |
| JP | 2018-176704 A | 11/2018 | |

(Continued)

*Primary Examiner* — Alison L Hindenlang
*Assistant Examiner* — Virak Nguon
(74) *Attorney, Agent, or Firm* — WORKMAN NYDEGGER

(57) ABSTRACT

A method for manufacturing a three-dimensional shaped object includes: a stacking step of stacking a layer by discharging a shaping material from a nozzle while moving the nozzle with respect to a stage in accordance with shaping data with which a three-dimensional shaped object is shaped, the shaping data including path information indicating a movement path of the nozzle with respect to the stage and discharge amount information indicating a discharge amount of the shaping material in the movement path; and a data changing step of adding a cleaning command for cleaning the nozzle to the shaping data based on information included in the shaping data.

15 Claims, 12 Drawing Sheets

(51) Int. Cl.
*B29C 64/118* (2017.01)
*B29C 64/35* (2017.01)
*B33Y 10/00* (2015.01)
*B33Y 30/00* (2015.01)
*B33Y 40/20* (2020.01)
*B33Y 50/02* (2015.01)

(56) References Cited

U.S. PATENT DOCUMENTS

| | | | |
|---|---|---|---|
| 2017/0050388 A1* | 2/2017 | Minardi | B29C 64/106 |
| 2018/0117834 A1 | 5/2018 | Murao | |
| 2018/0304536 A1 | 10/2018 | Lee et al. | |
| 2019/0126554 A1 | 5/2019 | Iwase | |

FOREIGN PATENT DOCUMENTS

| | | |
|---|---|---|
| JP | 2018-176708 A | 11/2018 |
| JP | 2019-077152 A | 5/2019 |
| JP | 2021-030603 A | 3/2021 |

\* cited by examiner

| SHAPING MATERIAL | CLEANING FREQUENCY |
|---|---|
| MATERIAL A | F |
| MATERIAL B | 1.2 × F |
| MATERIAL C | 1.4 × F |

METHOD FOR MANUFACTURING THREE-DIMENSIONAL SHAPED OBJECT, THREE-DIMENSIONAL SHAPING SYSTEM, AND INFORMATION PROCESSING APPARATUS

The present application is based on, and claims priority from JP Application Serial Number 2021-138674, filed Aug. 27, 2021, the disclosure of which is hereby incorporated by reference herein in its entirety.

BACKGROUND

1. Technical Field

The present disclosure relates to a method for manufacturing a three-dimensional shaped object, a three-dimensional shaping system, and an information processing apparatus.

2. Related Art

Regarding a technique for shaping a three-dimensional shaped object, JP-A-2018-75825 discloses a three-dimensional shaping device including a cleaning mechanism for cleaning a discharge port from which a melted shaping material is discharged.

JP-A-2018-75825 discloses that the discharge port is cleaned in a middle of shaping. However, since it is necessary to interrupt the shaping in the middle in order to perform the cleaning, there is a possibility that shaping accuracy of the three-dimensional shaped object to be finally shaped may be affected depending on a position where the shaping is interrupted.

SUMMARY

According to a first aspect of the present disclosure, a method for manufacturing a three-dimensional shaped object is provided. The method for manufacturing a three-dimensional shaped object including: a stacking step of stacking a layer by discharging a shaping material from a nozzle while moving the nozzle with respect to a stage in accordance with shaping data with which a three-dimensional shaped object is shaped, the shaping data including path information indicating a movement path of the nozzle with respect to the stage and discharge amount information indicating a discharge amount of the shaping material in the movement path; and a data changing step of adding a cleaning command for cleaning the nozzle to the shaping data based on information included in the shaping data.

According to a second aspect of the present disclosure, a three-dimensional shaping system including a three-dimensional shaping device and an information processing apparatus is provided. In the three-dimensional shaping system, the three-dimensional shaping device includes a discharge unit configured to discharge a shaping material from a nozzle while moving the nozzle with respect to a stage in accordance with shaping data with which a three-dimensional shaped object is shaped, so as to stack a layer. The shaping data includes path information indicating a movement path of the nozzle with respect to the stage and discharge amount information indicating a discharge amount of the shaping material in the movement path. The information processing apparatus includes a data changing unit configured to add a cleaning command for cleaning the nozzle to the shaping data based on information included in the shaping data.

According to a third aspect of the present disclosure, an information processing apparatus is provided. The information processing apparatus is configured to supply shaping data to a three-dimensional shaping device configured to stack a layer by discharging a shaping material from a nozzle while moving the nozzle with respect to a stage in accordance with the shaping data with which a three-dimensional shaped object is shaped. The shaping data includes path information indicating a movement path of the nozzle with respect to the stage and discharge amount information indicating a discharge amount of the shaping material in the movement path. The information processing apparatus includes a data changing unit configured to add a cleaning command for cleaning the nozzle to the shaping data based on data included in the shaping data.

DESCRIPTION OF EXEMPLARY EMBODIMENTS

A. First Embodiment

Figure 1:
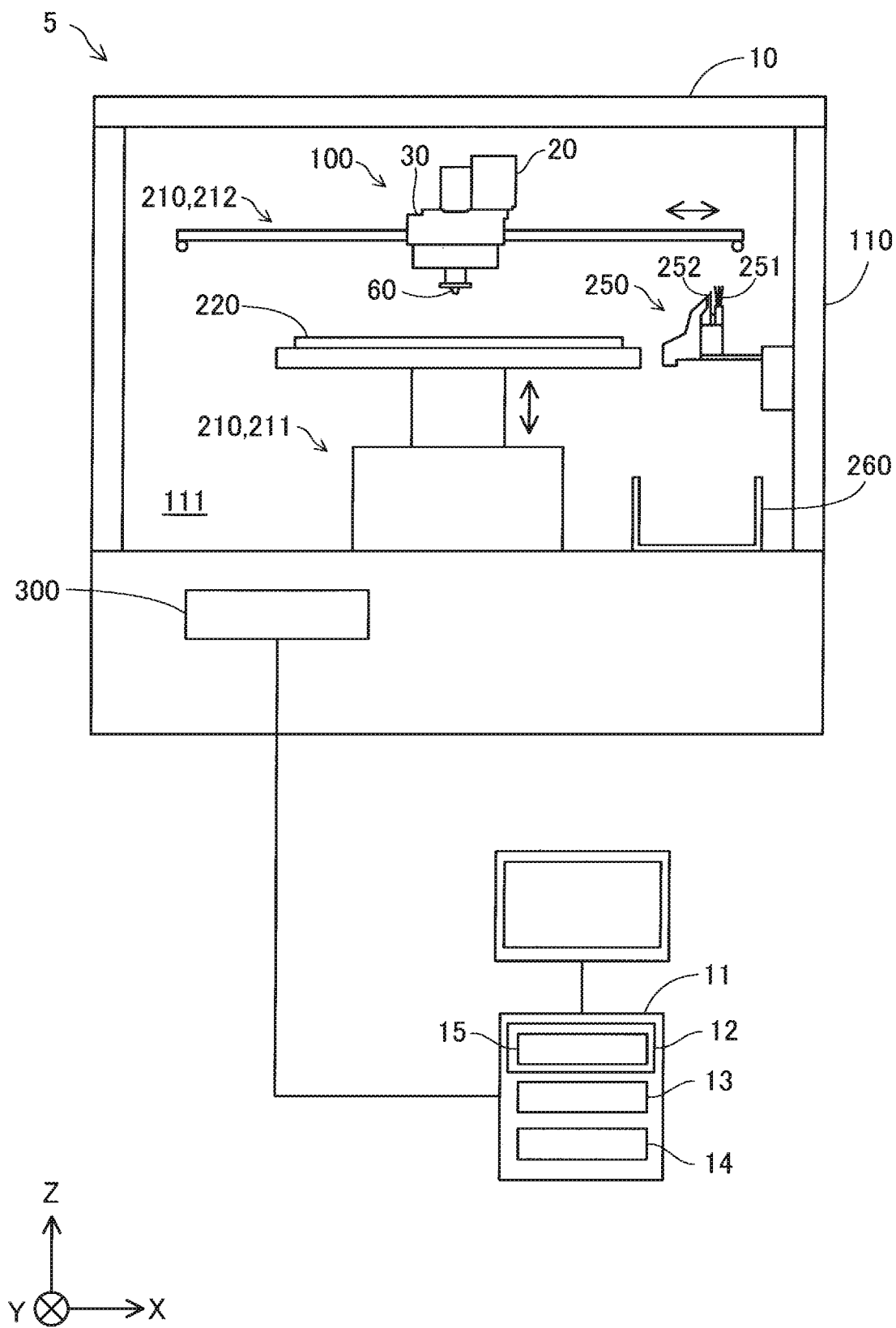
FIG. 1 is an illustrative diagram showing a schematic configuration of a three-dimensional shaping system.

FIG. 1 is an illustrative diagram showing a schematic configuration of a three-dimensional shaping system 5 according to a first embodiment. The three-dimensional shaping system 5 includes a three-dimensional shaping device 10 and an information processing apparatus 11. FIG. 1 shows arrows along X, Y, and Z directions orthogonal to one another. The X, Y, and Z directions are directions along an X-axis, a Y-axis, and a Z-axis, which are three spatial axes orthogonal to one another, and each includes both a direction on one side along the X-axis, the Y-axis, and the Z-axis and a direction opposite thereto. The X-axis and the Y-axis are axes along a horizontal plane, and the Z-axis is an axis along a vertical line. A -Z direction is a vertical direction, and a +Z direction is a direction opposite to the vertical direction. The -Z direction is also referred to as "lower", and the +Z direction is also referred to as "upper". The X, Y, and Z directions in FIG. 1 and X, Y, and Z directions in other drawings represent the same directions.

The information processing apparatus 11 is a computer including a CPU 12, a memory 13, and a storage device 14. The storage device 14 stores shaping data. The shaping data is data for shaping a three-dimensional shaped object. The shaping data includes movement path information indicating a movement path of a nozzle 60 provided in the three-dimensional shaping device 10 and discharge amount information indicating a discharge amount of a shaping material in the movement path. These pieces of information are described as various commands in the shaping data. The information processing apparatus 11 supplies the shaping data to the three-dimensional shaping device 10, and the three-dimensional shaping device 10 shapes a three-dimensional shaped object based on the shaping data supplied from the information processing apparatus 11.

The CPU 12 provided in the information processing apparatus 11 functions as a data changing unit 15 by reading a predetermined program from the storage device 14 onto the memory 13 and executing the program. The data changing unit 15 has a function of adding a cleaning command for cleaning the nozzle 60 provided in the three-dimensional shaping device 10 to the shaping data based on the information included in the shaping data. Details of this function will be described below.

The three-dimensional shaping device 10 includes a discharge unit 100, a material accommodating unit 20, a housing 110, a drive unit 210, a stage 220, a cleaning mechanism 250, and a control unit 300.

The discharge unit 100 includes a plasticizing mechanism 30 that plasticizes at least a part of a raw material supplied from the material accommodating unit 20 to generate a shaping material, and the nozzle 60. The discharge unit 100 discharges the shaping material plasticized by the plasticizing mechanism 30 from the nozzle 60 toward the stage 220.

The housing 110 has a shaping space 111 inside. The stage 220 on which the shaping material is stacked is disposed in the shaping space 111. The housing 110 may be provided with, for example, an opening portion that allows communication between the shaping space 111 and an outside, a door that opens and closes the opening portion, and the like. By opening the door to make the opening portion in an open state, a user can take out a shaped object shaped on the stage 220 from the opening portion.

The drive unit 210 changes a relative position between the discharge unit 100 and the stage 220. In the present embodiment, the drive unit 210 includes a first drive unit 211 that moves the stage 220 along the Z direction, and a second drive unit 212 that moves the discharge unit 100 along the X direction and the Y direction. The first drive unit 211 is formed as an elevating device, and includes a motor for moving the stage 220 in the Z direction. The second drive unit 212 is formed as a horizontal conveyance device, and includes a motor for sliding the discharge unit 100 along the X direction and a motor for sliding the discharge unit 100 along the Y direction. Each motor is driven under control of the control unit 300. In another embodiment, the drive unit 210 may be formed to move the stage 220 or the discharge unit 100 in three directions of X, Y, and Z, or may be formed to move the stage 220 along the X direction and the Y direction and to move the discharge unit 100 in the Z direction.

The cleaning mechanism 250 includes a brush 251 and a blade 252 for cleaning the nozzle 60. The cleaning mechanism 250 is disposed in a region different from the stage 220 in a horizontal direction. The cleaning mechanism 250 is disposed at a height at which the brush 251 and the blade 252 can come into contact with the nozzle 60 in the vertical direction. Below the cleaning mechanism 250, a purge waste container 260 is provided. A resin dust removed by the cleaning mechanism 250 falls and is collected in the purge waste container 260. The blade 252 is also referred to as a flicker plate. The cleaning mechanism 250 is also referred to as a tip wipe assembly.

The control unit 300 is formed by a computer including one or more processors, a memory, and an input and output interface that inputs and outputs signals from and to the outside. In the present embodiment, the control unit 300 controls the discharge unit 100 and the drive unit 210 in accordance with the shaping data by the processor executing a program or a command read onto the memory. By controlling the discharge unit 100 and the drive unit 210 in accordance with the shaping data, the discharge unit 100 shapes a three-dimensional shaped object by discharging the shaping material from the nozzle 60 and stacking layers while moving the nozzle 60 with respect to the stage 220 in accordance with the shaping data. The control unit 300 may be constituted by a combination of a plurality of circuits instead of the computer.

Figure 2:
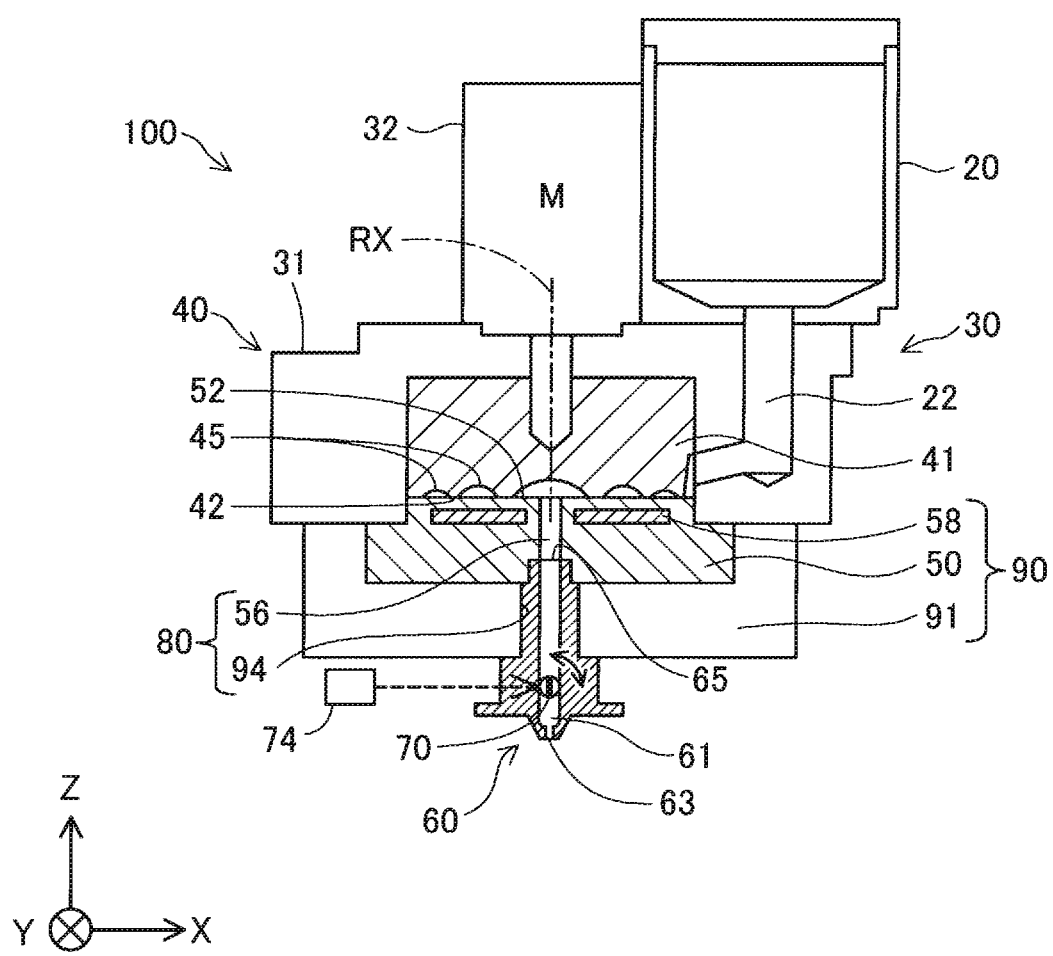
FIG. 2 is a diagram showing a schematic configuration of a discharge unit.

FIG. 2 is a diagram showing a schematic configuration of the discharge unit 100. The discharge unit 100 includes the plasticizing mechanism 30, the nozzle 60, and a flow rate adjusting unit 70. The plasticizing mechanism 30 includes a material conveying mechanism 40 and a heating block 90. A material accommodated in the material accommodating unit 20 is supplied to the discharge unit 100. Under the control of the control unit 300, the discharge unit 100 causes the plasticizing mechanism 30 to plasticize at least a part of the material supplied from the material accommodating unit 20 to generate a shaping material, and ejects the generated shaping material from the nozzle 60 onto the stage 220 to stack the shaping material. In the present embodiment, "plasticization" is a concept including melting, and refers to a change from a solid state to a flowable state. Specifically, in a case of a material in which glass transition occurs, the plasticization refers to setting a temperature of the material to be equal to or higher than a glass transition point. In a case of a material in which the glass transition does not occur, the plasticization refers to setting a temperature of the material to be equal to or higher than a melting point.

In the material accommodating unit 20 according to the present embodiment, a material in a state of pellets, powder, or the like is accommodated. In the present embodiment, the material accommodated in the material accommodating unit 20 is a pellet-shaped ABS resin. The material accommodating unit 20 according to the present embodiment is formed by a hopper. The material accommodated in the material accommodating unit 20 is supplied to the material conveying mechanism 40 of the plasticizing mechanism 30 via a supply path 22 provided below the material accommodating unit 20 so as to couple the material accommodating unit 20 and the discharge unit 100.

The heating block 90 includes a heater 58. The heater 58 is controlled by the control unit 300, and is heated to a plasticizing temperature for plasticizing the material. The plasticizing temperature varies depending on a type of the material to be used, and is, for example, the glass transition point or the melting point of the material. When the material is the ABS resin, the plasticizing temperature is set to, for example, about 110° C., which is the glass transition point of the ABS resin. The heating block 90 is provided with a through hole 80. The through hole 80 is formed to allow the nozzle 60 to be attached and detached. The material conveying mechanism 40 conveys the shaping material toward a nozzle flow path 61 of the nozzle 60 attached to the through hole 80 of the heating block 90. The plasticizing mechanism 30 conveys the material supplied from the material accommodating unit 20 to the material conveying mechanism 40 toward the nozzle flow path 61 of the nozzle 60 by the material conveying mechanism 40, and heats and plasticizes the material by the heat of the heating block 90.

The material conveying mechanism 40 according to the present embodiment includes a screw case 31, a screw 41 accommodated in the screw case 31, and a drive motor 32 that drives the screw 41. The heating block 90 according to the present embodiment includes a case portion 91 having an opening portion 94, and a barrel 50 disposed in the case portion 91. The barrel 50 is provided with a communication hole 56. The through hole 80 according to the present embodiment is formed by the opening portion 94 and the communication hole 56 communicating with each other. The above-described heater 58 is incorporated in the barrel 50. The screw 41 according to the present embodiment is a so-called flat screw, and may be referred to as a "scroll".

The screw 41 has a substantially cylindrical shape in which a height in a direction along a center axis RX of the screw 41 is smaller than a diameter. The screw 41 has a groove forming surface 42 in which screw grooves 45 are formed on a surface facing the barrel 50. The groove forming surface 42 faces a screw facing surface 52 of the barrel 50, which will be described later. The center axis RX according to the present embodiment coincides with a rotation axis of the screw 41. A configuration of the screw 41 will be described in detail later.

The drive motor 32 is coupled to a surface of the screw 41 opposite to the groove forming surface 42. The drive motor 32 is driven under the control of the control unit 300. The screw 41 is rotated around the center axis RX by a torque generated by rotation of the drive motor 32. The drive motor 32 may not be directly coupled to the screw 41, and may be coupled via, for example, a speed reducer.

The barrel 50 has the screw facing surface 52 facing the groove forming surface 42 of the screw 41. The case portion 91 is disposed so as to cover a surface of the barrel 50 opposite to the screw facing surface 52, that is, a lower surface of the barrel 50. The communication hole 56 and the opening portion 94 described above are provided at positions overlapping the center axis RX of the screw 41. That is, the through hole 80 is located at a position overlapping the center axis RX.

As described above, the nozzle 60 is detachably attached to the through hole 80 of the heating block 90. The nozzle 60 is also referred to as a nozzle tip. The nozzle 60 is provided with the above-described nozzle flow path 61. The nozzle flow path 61 has a nozzle opening 63 at a tip end of the nozzle 60, and has an inflow port 65 at a rear end of the nozzle 60. The nozzle opening 63 is located at a position in the −Z direction of the inflow port 65. The nozzle 60 according to the present embodiment discharges the material, which flows into the nozzle flow path 61 via the communication hole 56 and the inflow port 65, from the nozzle opening 63 toward the stage 220.

The flow rate adjusting unit 70 changes an opening degree of the nozzle flow path 61 by rotation in the nozzle flow path 61. In the present embodiment, the flow rate adjusting unit 70 is formed by a butterfly valve. The flow rate adjusting unit 70 is driven by a valve drive unit 74 under the control of the control unit 300. The valve drive unit 74 is formed by, for example, a stepping motor. The control unit 300 can adjust a flow rate of the shaping material flowing from the material conveying mechanism 40 to the nozzle 60, that is, a flow rate of the shaping material discharged from the nozzle 60, by controlling a rotation angle of the butterfly valve using the valve drive unit 74. The flow rate adjusting unit 70 adjusts the flow rate of the shaping material and controls ON/OFF of an outflow of the shaping material.

Figure 3:
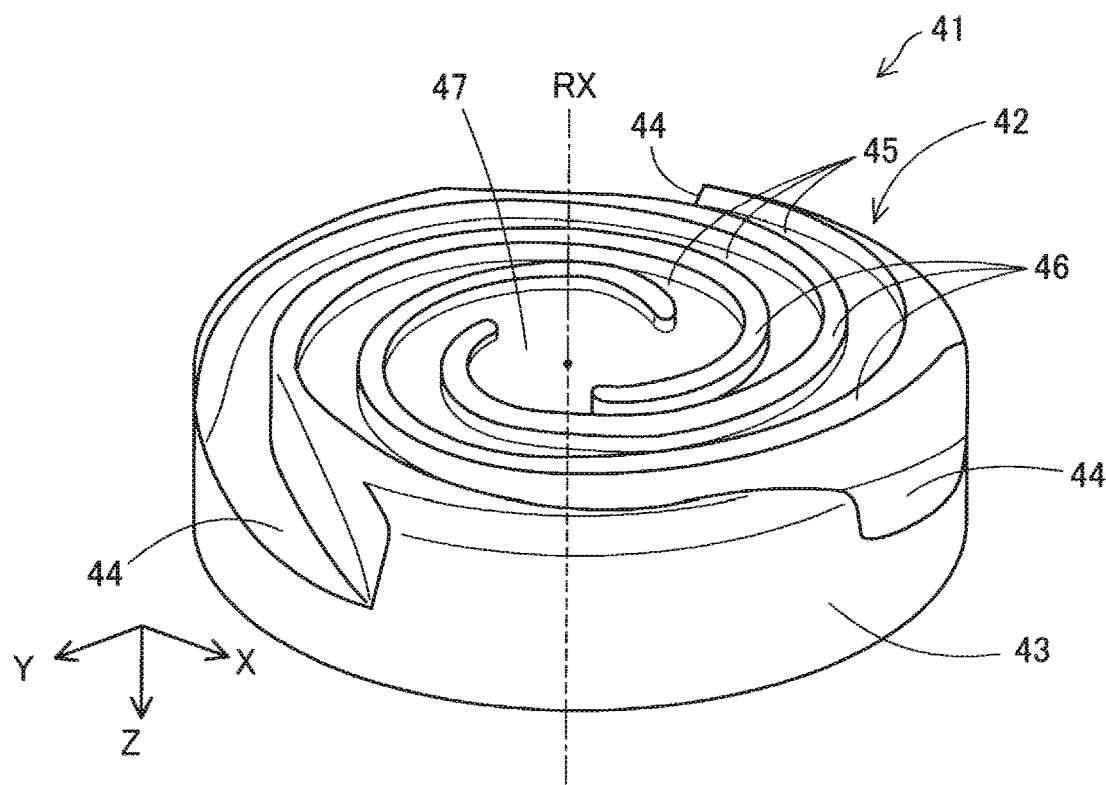
FIG. 3 is a schematic perspective view showing a configuration of a screw.

FIG. 3 is a schematic perspective view showing the configuration of the screw 41 on a groove forming surface 42 side. In FIG. 3, a position of the center axis RX of the screw 41 is indicated by a one-dot chain line. As described above, the screw grooves 45 are provided on the groove forming surface 42. A screw center portion 47, which is a center portion of the groove forming surface 42 of the screw 41, is formed as a recess to which one end of each screw groove 45 is coupled. The screw center portion 47 faces the communication hole 56 of the barrel 50. The screw center portion 47 intersects the center axis RX.

The screw groove 45 of the screw 41 forms a so-called scroll groove. The screw groove 45 extends in a spiral shape from the screw center portion 47 toward an outer periphery of the screw 41 in a manner of drawing an arc. The screw groove 45 may be formed to extend in an involute curve shape or a spiral shape. The groove forming surface 42 is provided with a ridge portion 46 that forms a side wall portion of the screw groove 45 and extends along each screw groove 45. The screw grooves 45 are continuous up to material introduction ports 44 formed in a side surface 43 of the screw 41. The material introduction port 44 is a portion that receives the material supplied via the supply path 22 of the material accommodating unit 20.

FIG. 3 shows an example of the screw 41 having three screw grooves 45 and three ridge portions 46. The number of the screw grooves 45 and the number of the ridge portions 46 provided at the screw 41 are each not limited to three. The screw 41 may be provided with only one screw groove 45, or two or more (a plurality of) screw grooves 45. FIG. 3 shows an example of the screw 41 in which the material introduction ports 44 are formed at three positions. The number of positions of the material introduction ports 44 provided in the screw 41 is not limited to three. The screw 41 may be provided with the material introduction port 44 at only one position, or with the material introduction ports 44 at two or more (a plurality of) positions.

Figure 4:
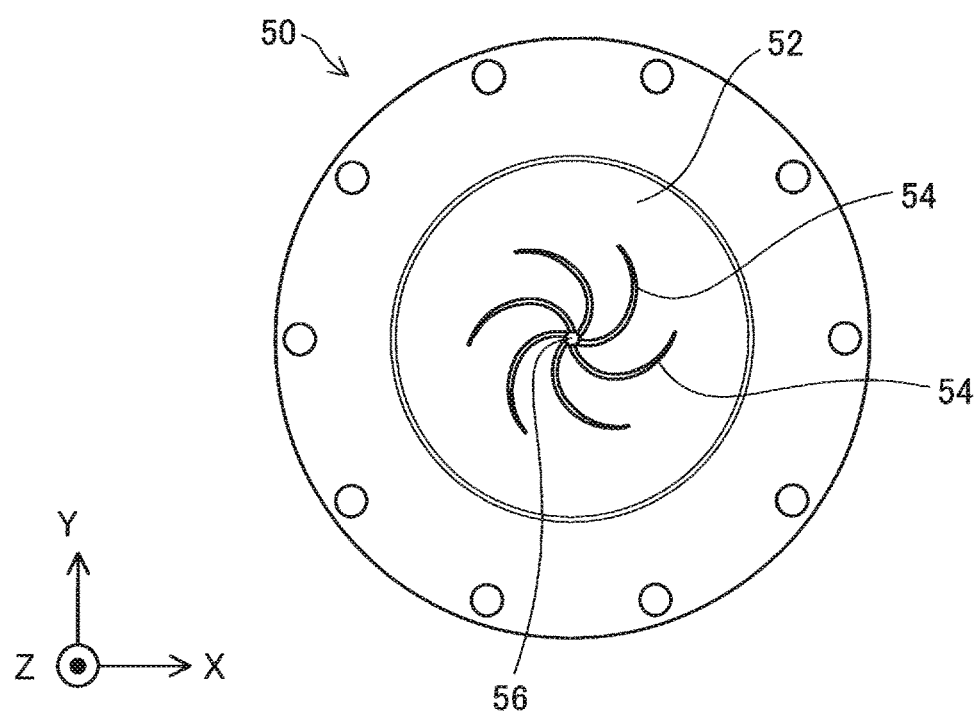
FIG. 4 is a top view showing a configuration of a barrel.

FIG. 4 is a top view showing a configuration of the barrel 50 on a screw facing surface 52 side. As described above, the communication hole 56 is formed in a center of the screw facing surface 52. A plurality of guide grooves 54 are formed around the communication hole 56 in the screw facing surface 52. Each of the guide grooves 54 has one end coupled to the communication hole 56, and extends in a spiral shape from the communication hole 56 toward an outer periphery of the screw facing surface 52. Each of the guide grooves 54 has a function of guiding the shaping material to the communication hole 56. One end of the guide groove 54 may not be coupled to the communication hole 56. The guide groove 54 may not be formed in the barrel 50.

Figure 5:
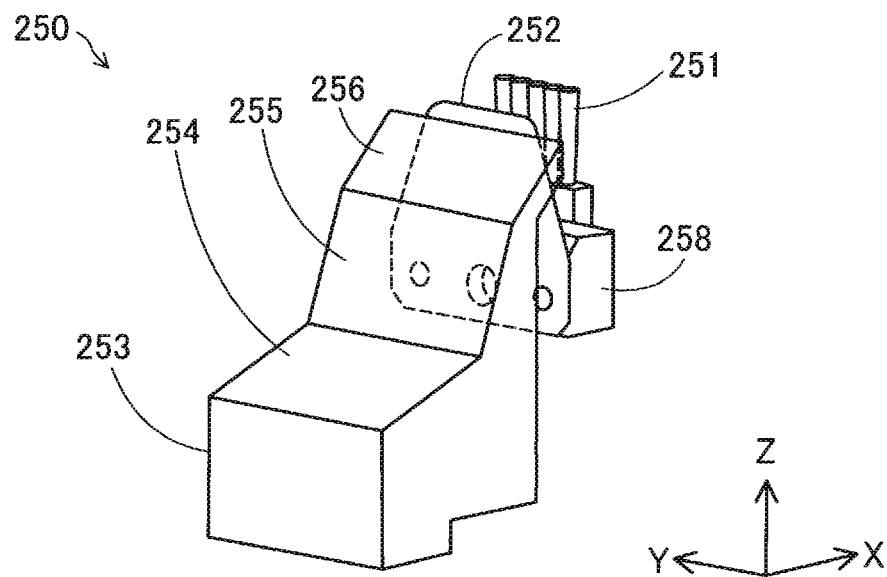
FIG. 5 is an illustrative diagram showing a schematic configuration of a cleaning mechanism.

FIG. 5 is an illustrative diagram showing a schematic configuration of the cleaning mechanism 250. As described above, the cleaning mechanism 250 includes the brush 251 and the blade 252. The brush 251 is formed by arranging a plurality of hair bundles along the Y direction. The blade 252 is a plate-shaped member along the Z direction and the Y direction. A tip end of the brush 251 and a tip end of the blade 252 face the +Z direction. The tip end of the blade 252 is disposed lower than the tip end of the brush 251. As described above, the brush 251 and the blade 252 are disposed at the height at which the brush 251 and the blade 252 can come into contact with the nozzle 60. In the present embodiment, the brush 251 and the blade 252 are integrated by a fixture 258, and can be simultaneously replaced during consumption. The brush 251 and the blade 252 may be individually replaced.

The cleaning mechanism 250 further includes a purge unit 253. The purge unit 253 is also referred to as a purge ledge. In the present embodiment, the purge unit 253, the blade 252, and the brush 251 are arranged in this order along a +X direction. That is, the blade 252 is disposed between the purge unit 253 and the brush 251. A tip end of the purge unit 253 in the +Z direction is lower than the tip end of the blade 252. On the purge unit 253, the shaping material as a waste material ejected from the nozzle 60 falls, is collected into a spherical shape on the purge unit 253, and falls into the purge waste container 260. An upper surface of the purge unit 253 is formed as an inclined surface in order to promote the fall of the waste material. More specifically, the purge unit 253 includes a first inclined surface 254, a second inclined surface 255, and a third inclined surface 256 in an order of being far from the blade 252 and in an order of lower position in the vertical direction. The first inclined surface 254, the second inclined surface 255, and the third inclined surface 256 are each inclined such that a position of an end portion thereof in the +X direction is higher than a position of an end portion thereof in the −X direction. In the present embodiment, inclination angles of the second inclined surface 255 and the third inclined surface 256 with respect to the horizontal plane are larger than an inclination angle of the first inclined surface 254 with respect to the horizontal plane.

Although the cleaning mechanism 250 in the present embodiment includes the brush 251, the blade 252, and the purge unit 253, for example, the purge unit 253 may be omitted. Further, for example, the cleaning mechanism 250 may only include the brush 251 or only include the blade 252.

Figure 6:
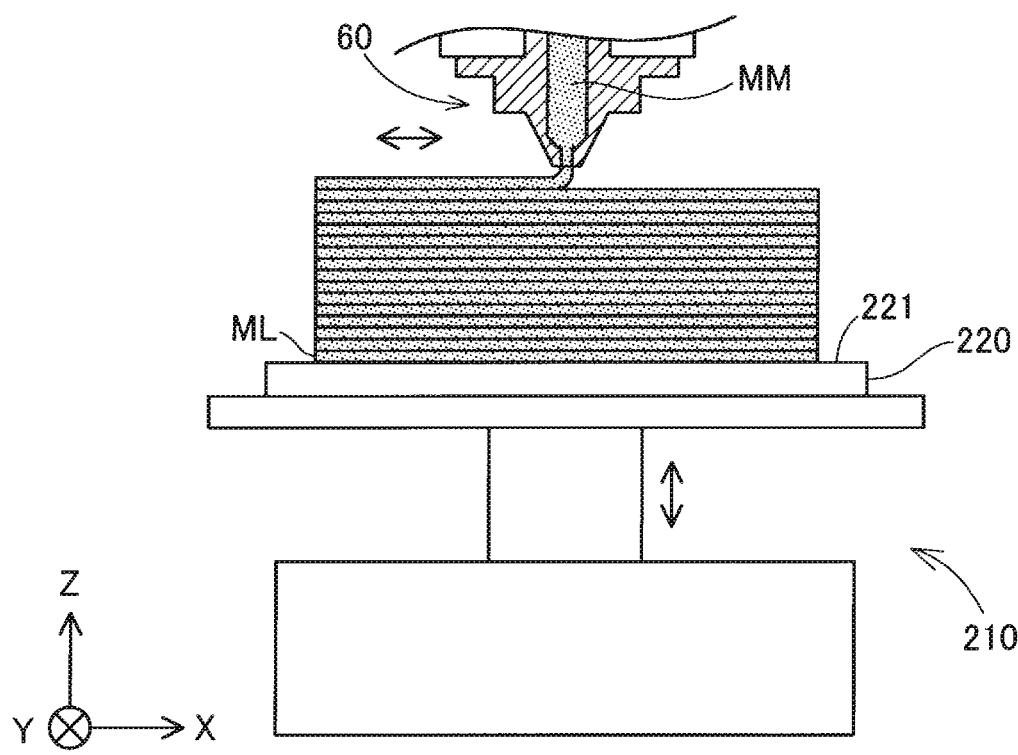
FIG. 6 is an illustrative diagram schematically showing a state of shaping a three-dimensional shaped object.

FIG. 6 is an illustrative diagram schematically showing a state of shaping a three-dimensional shaped object in the three-dimensional shaping device 10. In the three-dimensional shaping device 10, as described above, in the discharge unit 100, a solid raw material MR supplied to the screw groove 45 of the rotating screw 41 is melted to generate a shaping material MM. The control unit 300 causes the nozzle 60 to discharge the shaping material MM while changing a position of the nozzle 60 with respect to the stage 220 in a direction along a shaping surface 221 of the stage 220 by controlling the drive unit 210 with a distance maintained constant between the shaping surface 221 on the stage 220 and the nozzle 60. The shaping material MM discharged from the nozzle 60 is continuously deposited in a moving direction of the nozzle 60, and a layer ML is formed. After one layer ML is formed, the control unit 300 lowers the stage 220 to move the position of the nozzle 60 with respect to the stage 220 in the +Z direction. Then, the layer ML is further deposited on the layers ML formed so far to shape the three-dimensional shaped object.

For example, the control unit 300 may temporarily interrupt the discharge of the shaping material from the nozzle 60 when the nozzle 60 moves in the Z direction after one layer ML is completely formed or when there are a plurality of independent shaping regions in each layer. In this case, the control unit 300 cause the flow rate adjusting unit 70 to close the nozzle flow path 61, so as to stop the discharge of the shaping material MM from the nozzle opening 63. After the position of the nozzle 60 is changed, the control unit 300 causes the flow rate adjusting unit 70 to open the nozzle flow path 61, so as to restart the deposition of the shaping material MM from a changed position of the nozzle 60.

Figure 7:
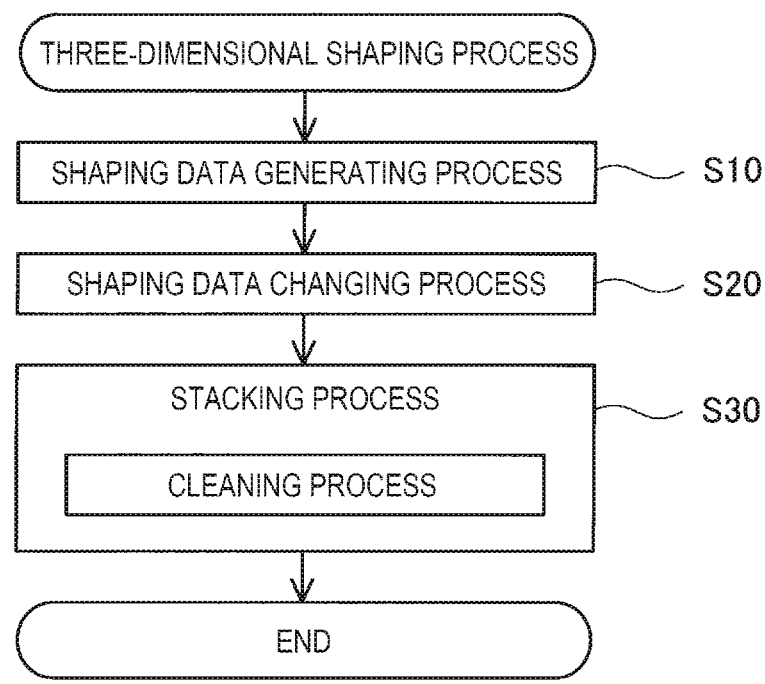
FIG. 7 is a flowchart of a three-dimensional shaping process.

FIG. 7 is a flowchart of a three-dimensional shaping process indicating a method for manufacturing a three-dimensional shaped object. In step S10, the information processing apparatus 11 executes a shaping data generating process. In the shaping data generating process, the information processing apparatus 11 acquires shape data such as three-dimensional CAD data indicating a shape of the three-dimensional shaped object, analyzes the shape data, and slices the shape of the three-dimensional shaped object into a plurality of layers along an XY plane. Then, the information processing apparatus 11 generates the movement path information indicating the movement path of the nozzle for filling an outer shell and an inner region of each layer. The movement path information includes data indicating a plurality of linear movement paths. Each movement path included in the movement path information includes the discharge amount information indicating the discharge amount of the shaping material discharged in the corresponding movement path. The information processing apparatus 11 generates the shaping data by generating the movement path information and the discharge amount information for all the layers. Step S10 is also referred to as a shaping data generating step. The shaping data is represented by, for example, a G code. In another embodiment, instead of generating the shaping data, the information processing apparatus 11 may acquire the already generated shaping data via a network or a recording medium.

In step S20, the data changing unit 15 executes a shaping data changing process. In the shaping data changing process, the data changing unit 15 analyzes the shaping data and adds the cleaning command for cleaning the nozzle 60 to the shaping data based on the information included in the shaping data. The cleaning command may be represented by one command for instructing the three-dimensional shaping device 10 to execute a cleaning process, or may be represented by a group of series of commands representing cleaning operations of the nozzle 60. Details of the shaping data changing process will be described later. Step S20 is also referred to as a data changing step.

In step S30, the control unit 300 of the three-dimensional shaping device 10 executes a stacking process. In the stacking process, the control unit 300 acquires the shaping data from the information processing apparatus 11, and as shown in FIG. 6, the control unit 300 shapes the three-dimensional shaped object by discharging the shaping material from the nozzle 60 while moving the nozzle 60 and stacking a plurality of layers in accordance with the shaping data. During the stacking process, the cleaning process for cleaning the nozzle 60 is executed in accordance with the cleaning command added to the shaping data in step S20. In the first embodiment, in the cleaning process, an operation for rubbing the tip end of the nozzle 60 against the brush 251 and the blade 252 of the cleaning mechanism 250 is executed. Step S30 is also referred to as a stacking step.

Figure 8:
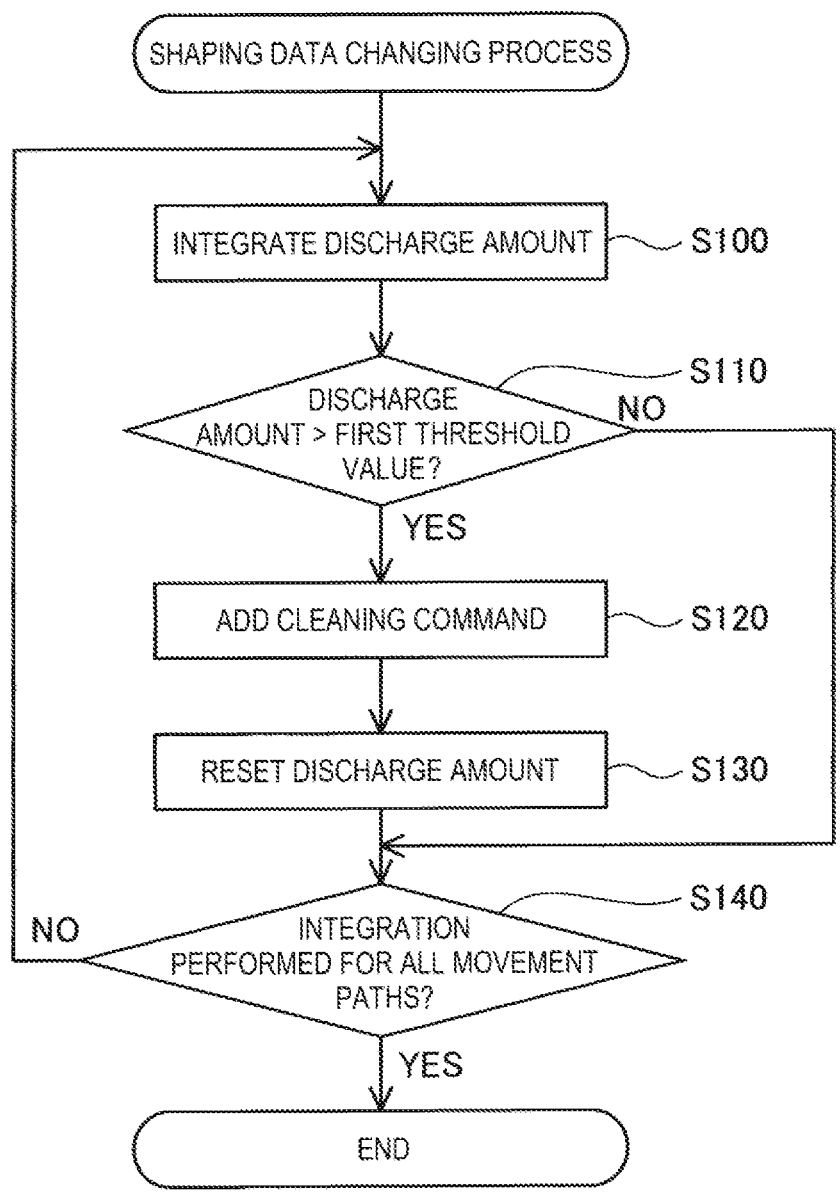
FIG. 8 is a detailed flowchart of a shaping data changing process.

FIG. 8 is a detailed flowchart of the shaping data changing process executed in step S20 of the above-described three-dimensional shaping process. In step S100, the data changing unit 15 sequentially reads the movement path information from the shaping data, and integrates the discharge amounts of the shaping material based on the discharge amount information corresponding to the movement path information.

In step S110, the data changing unit 15 determines whether the discharge amount integrated in step S100 exceeds a first threshold value. When it is determined that the integrated discharge amount exceeds the first threshold value, the data changing unit 15 adds the cleaning command to the shaping data in step S120. Specifically, in the present embodiment, the cleaning command is added to the shaping data, so that cleaning is performed at a timing at which a shaping target is switched from a layer to which a current movement path belongs to a next layer. That is, the cleaning command is added to the shaping data, so that the cleaning is performed at a timing at which the nozzle 60 relatively moves in the +Z direction with respect to the stage 220 after shaping of the layer including the current movement path is completed. Therefore, the cleaning command is added after a command for shaping a movement path to be shaped last in the current layer and before a command for shaping a movement path to be shaped first in the next layer. After adding the cleaning command, in step S130, the data changing unit 15 resets the integrated discharge amount. The above-described first threshold value is a value determined in advance by obtaining a relationship between the discharge amount of the shaping material and contamination of the nozzle 60 through experiments or simulations.

After resetting the discharge amount in step S130 or after it is determined in step S110 that the integrated discharge amount does not exceed the first threshold value, the data changing unit 15 determines in step S140 whether the integration of the discharge amount is performed for all the movement paths. When it is determined that the integration is not performed for all the movement paths, the data changing unit 15 returns the process to step S100, reads the next movement path information, integrates the discharge amount, and repeats the above-described series of processes. On the other hand, when it is determined that the integration of the discharge amounts is completed for all the movement paths, the data changing unit 15 ends the shaping data changing process.

According to the three-dimensional shaping system 5 of the present embodiment described above, the information processing apparatus 11 adds, to the shaping data, the cleaning command for executing the cleaning in accordance with the information included in the shaping data. Therefore, for example, it is possible to prevent the cleaning process from being unintentionally executed during the layer shaping executed by the three-dimensional shaping device 10. As a result, it is possible to reduce a possibility that the cleaning process affects shaping accuracy of the three-dimensional shaped object to be finally shaped. Particularly, in the present embodiment, the cleaning command is added to the shaping data, so that the cleaning is performed at the timing at which the layer of the shaping target is switched, and thus it is possible to further reduce the possibility that the cleaning process affects the shaping accuracy of the three-dimensional shaped object.

B. Second Embodiment

In the above-described first embodiment, the cleaning of the nozzle 60 is performed by executing the cleaning process in the stacking process in step S30 of the three-dimensional shaping process shown in FIG. 7. In a second embodiment, contents of the cleaning process are different from those of the first embodiment. In the second embodiment and third to fifth embodiments to be described later, a cleaning command added to the shaping data indicates a timing at which the execution of the cleaning process is started, and specific cleaning operations are controlled by the control unit 300 of the three-dimensional shaping device 10. However, the group of series of commands, as the cleaning command, for implementing the cleaning process may be added to the shaping data, and the control unit 300 of the three-dimensional shaping device 10 may control the relative movement of the nozzle 60 and the discharge operation performed by the discharge unit 100 while interpreting the commands, and perform cleaning operations same as those of the third to fifth embodiments.

Figure 9:
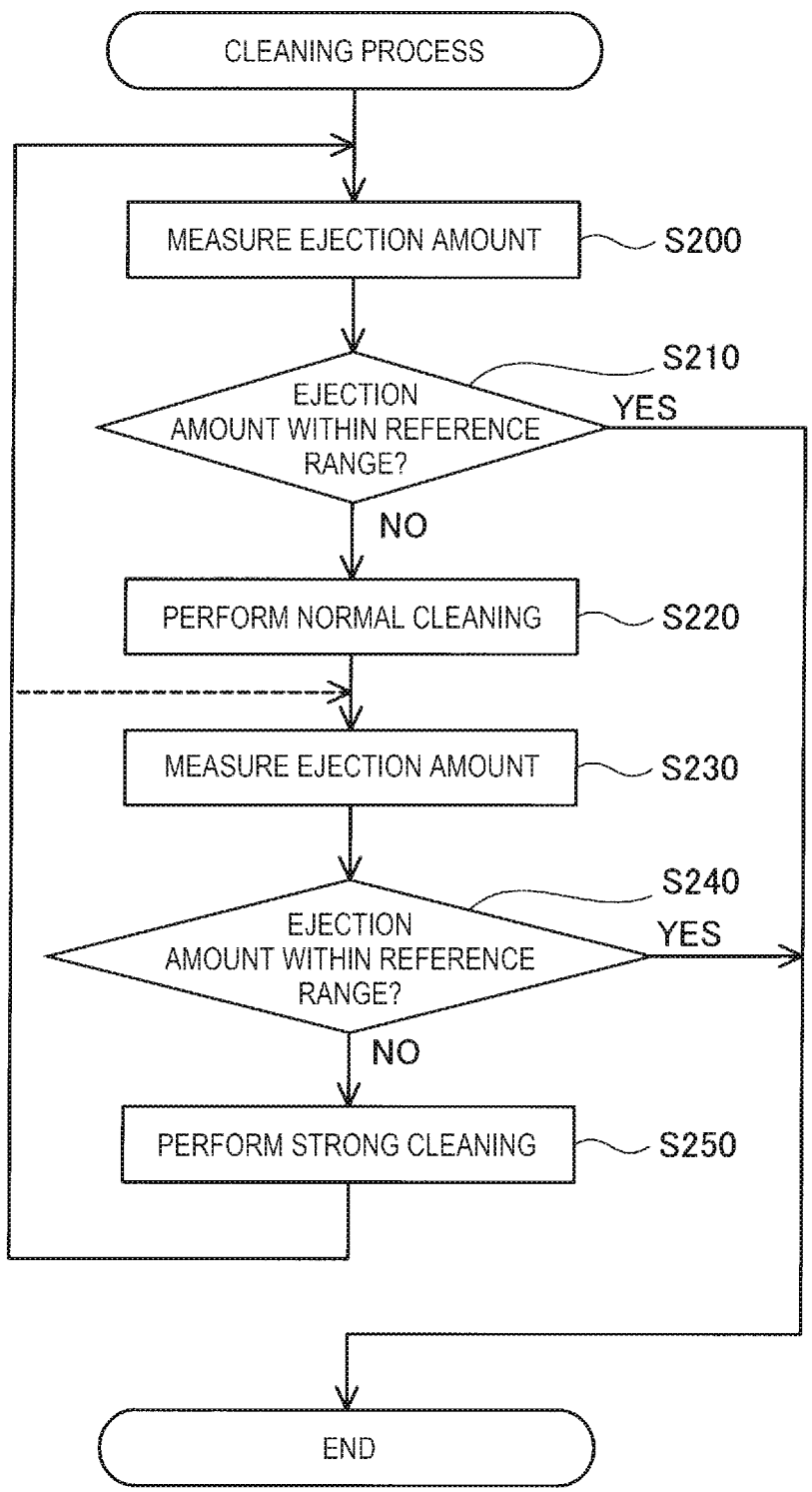
FIG. 9 is a detailed flowchart of a cleaning process according to a second embodiment.

FIG. 9 is a detailed flowchart of the cleaning process executed in the second embodiment. When the cleaning process is started, first, in step S200, the control unit 300 of the three-dimensional shaping device 10 moves the nozzle 60 above the purge unit 253 to eject the shaping material as the waste material, and measures an ejection amount thereof. The ejection amount indicates a discharge state of the shaping material from the nozzle 60. In the present embodiment, a weight sensor is provided in the purge waste container 260, and the ejection amount of the shaping material is measured by measuring a weight of the shaping material ejected within a predetermined time. The process of step S200 is also referred to as a measuring step. Then, in step S210, the control unit 300 determines whether the ejection amount is within a predetermined reference range, that is, whether the measured discharge state reaches a predetermined discharge state.

When it is determined in step S210 that the ejection amount is within the reference range, the control unit 300 ends the cleaning process. On the other hand, when it is determined that the ejection amount is not within the reference range, the control unit 300 executes normal cleaning. The normal cleaning means that the tip end of the nozzle 60 is reciprocated on the cleaning mechanism 250 a predetermined number of times to perform cleaning.

After executing the normal cleaning, the control unit 300 measures the ejection amount again in step S230. Then, in step S240, it is determined whether the ejection amount is within the reference range.

When it is determined in step S240 that the ejection amount is within the reference range, the control unit 300 ends the cleaning process. On the other hand, when it is determined that the ejection amount is not within the reference range, the control unit 300 executes strong cleaning in step S250. The strong cleaning is cleaning having a higher intensity than the normal cleaning. In the present embodiment, the control unit 300 executes the strong cleaning by reciprocating the nozzle 60 on the cleaning mechanism 250 more times than the number of times for which the nozzle 60 is reciprocated in the normal cleaning.

After the strong cleaning is executed, the control unit 300 returns the process to step S200. In this manner, in step S210, it is determined again whether the ejection amount is within the reference range, and as long as the ejection amount is not within the reference range, the normal cleaning is executed in step S220.

According to the second embodiment described above, even when the cleaning process is started, the cleaning is not performed as long as the actually measured ejection amount is within the reference range. Therefore, it is possible to prevent consumption of the nozzle 60 due to the cleaning. Further, in the present embodiment, since the ejection amount is measured after the normal cleaning is performed, it is possible to confirm whether the nozzle 60 is cleaned by the cleaning. Then, when the nozzle 60 is not cleaned, the intensity of the cleaning is improved and the strong cleaning is executed, and thus cleanliness of the nozzle 60 can be improved.

In the second embodiment, the control unit 300 returns the process to step S200 after executing the strong cleaning in step S250. On the other hand, the control unit 300 may return the process to step S230 after executing the strong cleaning in step S250. In this manner, as long as the ejection amount is not within the reference range after the strong cleaning, the strong cleaning is executed again.

C. Third Embodiment

Figure 10:
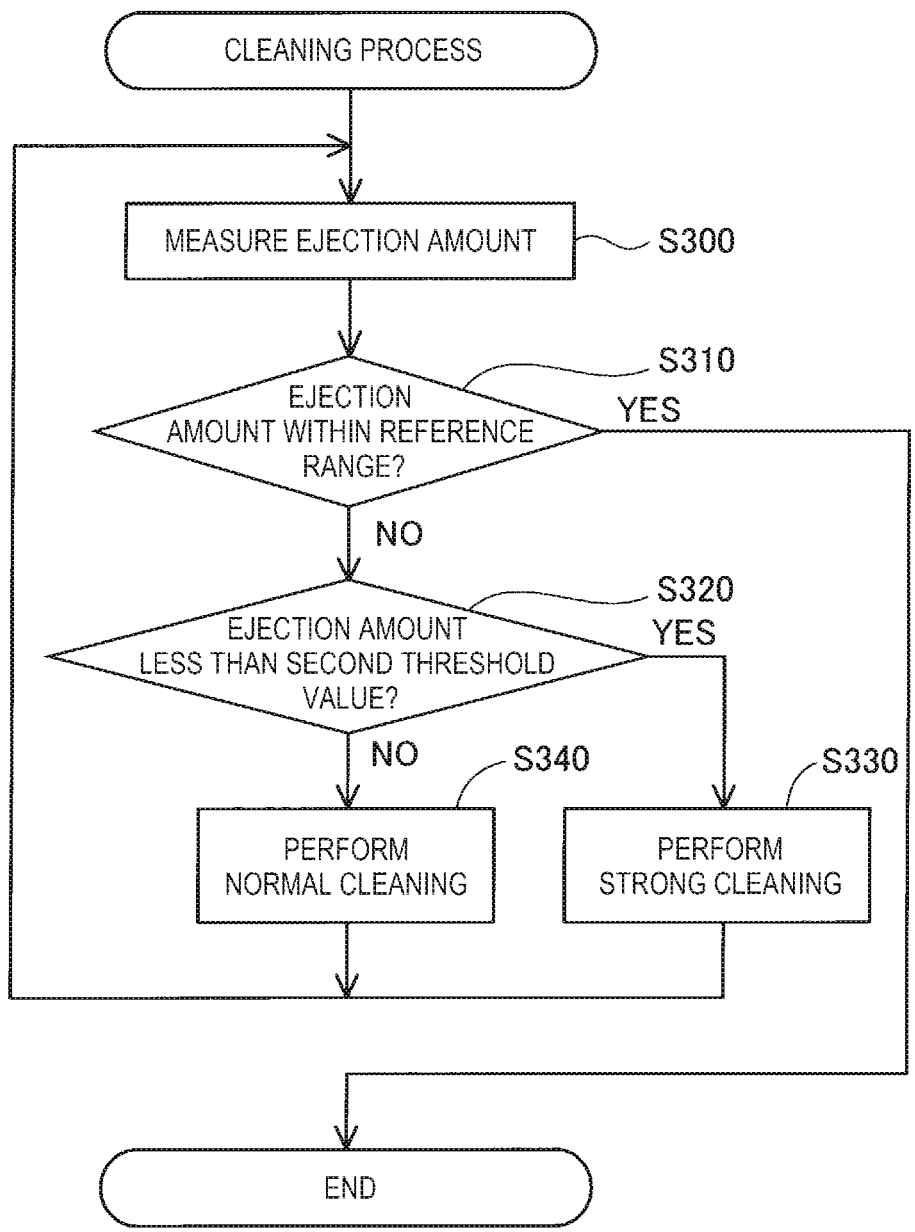
FIG. 10 is a detailed flowchart of a cleaning process according to a third embodiment.

FIG. 10 is a detailed flowchart of a cleaning process executed in a third embodiment. In the third embodiment, contents of the cleaning process are different from those of the above-described embodiments.

In the third embodiment, when the cleaning process is started, first, in step S300, the control unit 300 of the three-dimensional shaping device 10 moves the nozzle 60 above the purge unit 253 to eject the shaping material as the waste material, and measures an ejection amount thereof. Then, in step S310, the control unit 300 determines whether the ejection amount is within the predetermined reference range.

When it is determined in step S310 that the ejection amount is within the reference range, the control unit 300 ends the cleaning process. On the other hand, when it is determined that the ejection amount is not within the reference range, in step S320, the control unit 300 determines whether the ejection amount is less than a second threshold value. When it is determined that the ejection amount is less than the second threshold value, the control unit 300 executes the strong cleaning in step S330. On the other hand, when it is determined that the ejection amount is not less than the second threshold value, that is, is equal to or more than the second threshold value, the control unit 300 executes the normal cleaning in step S340.

After the normal cleaning or the strong cleaning is executed in step S330 or step S340, the control unit 300 returns the process to step S300. Then, the ejection amount is measured again, and the above-described processes are repeated until the ejection amount is within the reference range.

According to the third embodiment described above, as in the second embodiment, the cleaning is not performed as long as the actually measured ejection amount is within the reference range. Therefore, it is possible to prevent the consumption of the nozzle 60. Further, in the present embodiment, in the case in which the ejection amount of the shaping material is not within the reference range, when the ejection amount is less than the second threshold value, the strong cleaning is executed without executing the normal cleaning, and thus time required for the cleaning process can be shortened. The second threshold value is a value that is highly likely to allow the ejection amount to be within the reference range by the execution of the strong cleaning, and can be determined in advance by simulations or experiments.

In the third embodiment, the normal cleaning or the strong cleaning is executed in accordance with the ejection amount. On the other hand, for example, by using two or more threshold values, cleaning in three or more stages having different intensities may be executed in accordance with the ejection amount. When it is determined that the ejection amount is less than the second threshold value, the control unit 300 may execute the normal cleaning instead of the strong cleaning.

D. Fourth Embodiment

Figure 11:
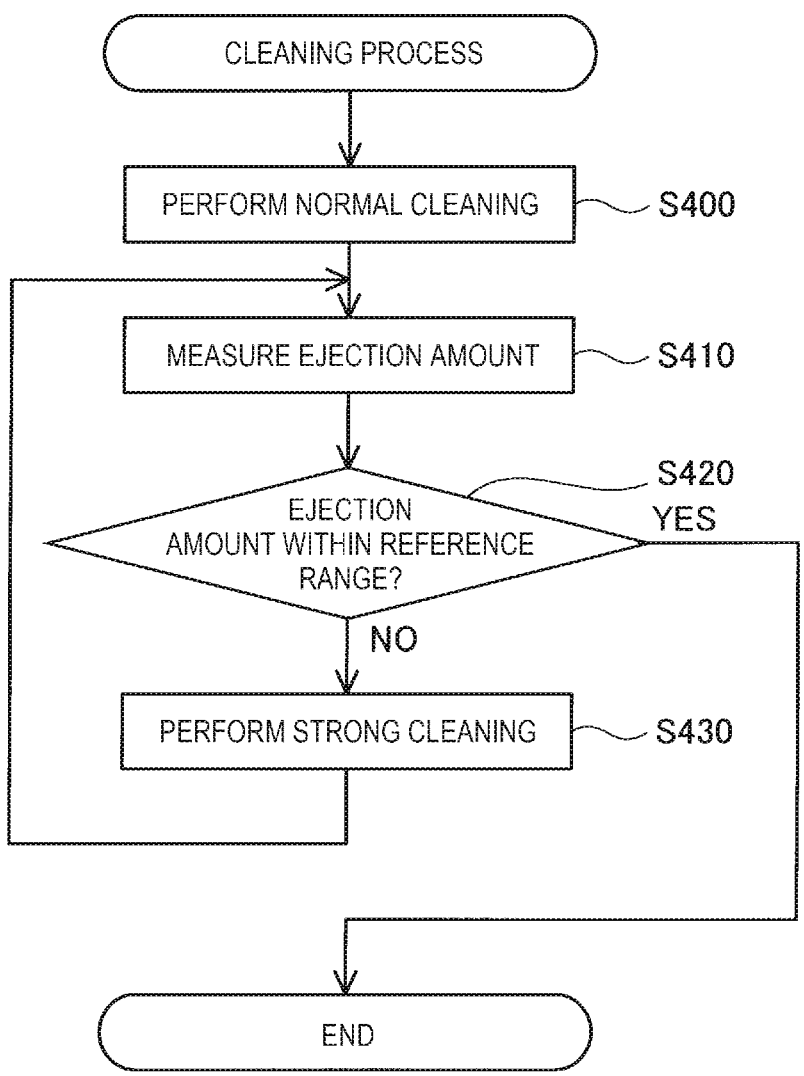
FIG. 11 is a detailed flowchart of a cleaning process according to a fourth embodiment.

FIG. 11 is a detailed flowchart of a cleaning process executed in a fourth embodiment. In the fourth embodiment, contents of the cleaning process are different from those of the above-described embodiments.

In the fourth embodiment, when the cleaning process is started, in step S400, the control unit 300 of the three-dimensional shaping device 10 first executes the normal cleaning. After executing the normal cleaning, the control unit 300 measures the ejection amount in step S410. Then, in step S420, it is determined whether the ejection amount is within the reference range.

When it is determined in step S420 that the ejection amount is within the reference range, the control unit 300 ends the cleaning process. On the other hand, when it is determined that the ejection amount is not within the reference range, the control unit 300 executes strong cleaning in step S430.

After the strong cleaning is executed, the control unit 300 returns the process to step S410. In this manner, in step S410, it is determined again whether the ejection amount is within the reference range, and as long as the ejection amount is not within the reference range, the strong cleaning is executed again in step S430.

According to the fourth embodiment described above, when the execution of the cleaning process is started, the normal cleaning is immediately executed without measuring the ejection amount. Therefore, it is possible to shorten cleaning time of the nozzle 60.

E. Fifth Embodiment

Figure 12:
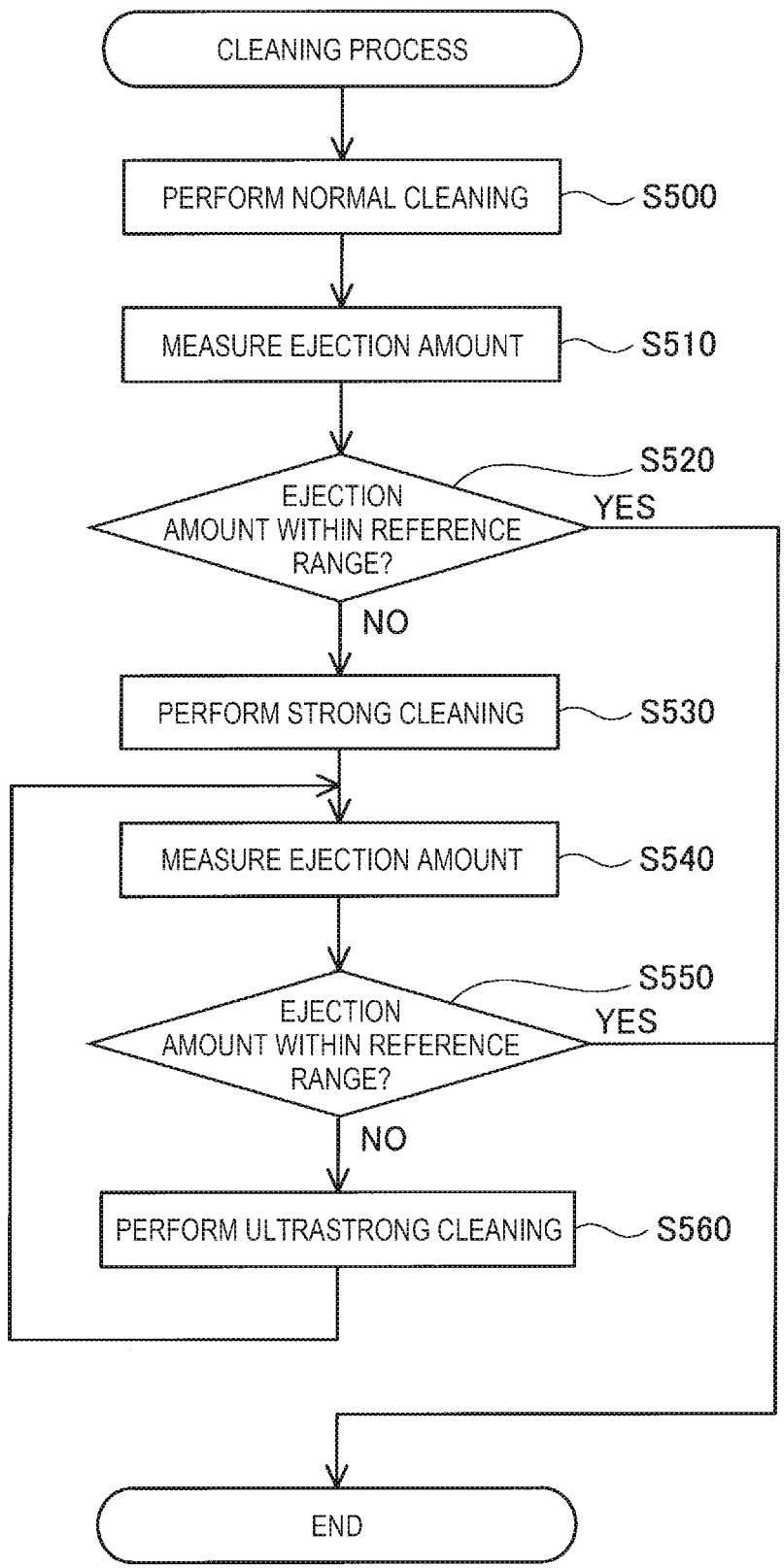
FIG. 12 is a detailed flowchart of a cleaning process according to a fifth embodiment.

FIG. 12 is a detailed flowchart of a cleaning process executed in a fifth embodiment. In the fifth embodiment, contents of the cleaning process are different from those of the above-described embodiments.

In the fifth embodiment, when the cleaning process is started, in step S500, the control unit 300 of the three-dimensional shaping device 10 first executes the normal cleaning. After executing the normal cleaning, the control unit 300 measures the ejection amount in step S510. Then, in step S520, it is determined whether the ejection amount is within the reference range.

When it is determined in step S520 that the ejection amount is within the reference range, the control unit 300 ends the cleaning process. On the other hand, when it is determined that the ejection amount is not within the reference range, the control unit 300 executes the strong cleaning in step S530. After executing the strong cleaning, the control unit 300 measures the ejection amount again in step S540. Then, in step S550, it is determined whether the ejection amount is within the reference range.

When it is determined in step S550 that the ejection amount is within the reference range, the control unit 300 ends the cleaning process. On the other hand, when it is determined that the ejection amount is not within the reference range, the control unit 300 executes ultrastrong cleaning in step S560. The ultrastrong cleaning is cleaning having a higher intensity than the strong cleaning. In the present embodiment, the control unit 300 executes the ultrastrong cleaning by reciprocating the nozzle 60 on the cleaning mechanism 250 more times than the number of times for which the nozzle 60 is reciprocated in the normal cleaning and the strong cleaning.

After executing the ultrastrong cleaning, the control unit 300 returns the process to step S540 and measures the ejection amount again. Then, the ultrastrong cleaning is repeated until the ejection amount is within the reference range.

According to the fifth embodiment described above, when the execution of the cleaning process is started, the normal cleaning is immediately executed without measuring the ejection amount. Therefore, it is possible to shorten cleaning time of the nozzle 60. Further, in the present embodiment, when the ejection amount is not within the reference range after the strong cleaning is performed, the ultrastrong cleaning is executed. Therefore, the cleaning of the nozzle 60 can be efficiently performed.

In the fifth embodiment, when the execution of the cleaning process is started, the normal cleaning is executed without measuring the ejection amount. On the other hand, as in the second embodiment, the control unit 300 may measure the ejection amount when the execution of the cleaning process is started, and may execute the normal cleaning when it is determined that the ejection amount is not within the reference range.

Figures 13, 14:
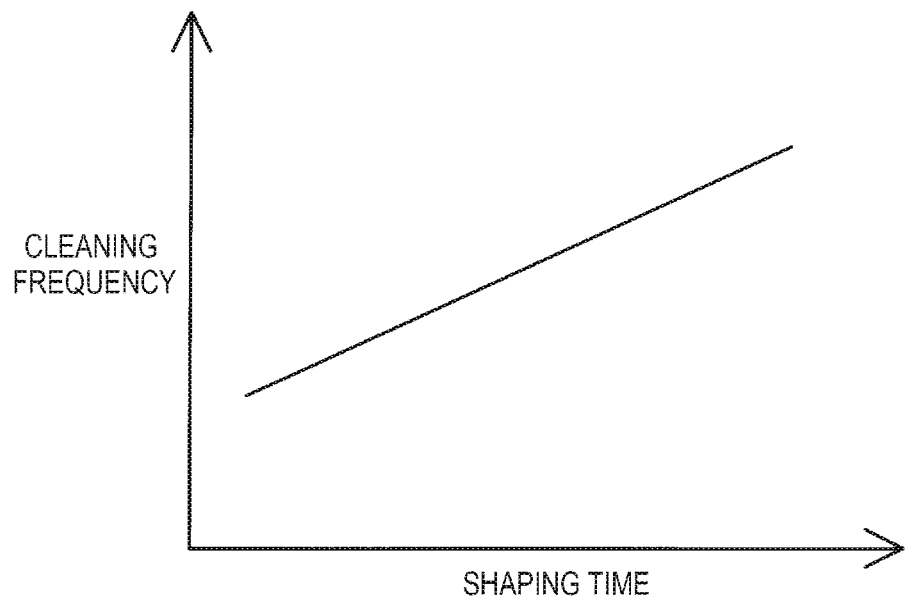
FIG. 13 is a diagram showing a relationship between a shaping time and a frequency at which the cleaning process is executed.
FIG. 14 is a table showing a relationship between a type of a shaping material and the frequency at which the cleaning process is executed.

F. Other Embodiments (F1) FIG. 13 is a diagram showing a relationship between a shaping time and a frequency at which the cleaning process is executed. In each of the embodiments described above, as shown in FIG. 13, the data changing unit 15 may add the cleaning command such that the frequency at which the cleaning process is executed increases as the shaping time elapses. In this manner, it is possible to improve the cleanliness of the nozzle 60 in a shaping process of which the shaping time is long. For example, in the above-described first embodiment, if the data changing unit 15 decreases the first threshold value as the shaping time becomes longer, the frequency at which the cleaning process is executed can be increased as the shaping time elapses. Further, for example, the cleaning command may be added such that the cleaning is executed at the timing of the layer switching in a first half of the shaping, and in a second half of the shaping, the cleaning command may be added such that the cleaning is executed also at a timing at which the nozzle 60 moves to a distant position in the same layer in addition of the timing of the layer switching. When the cleaning is performed at the timing at which the nozzle 60 moves to a distant position in the same layer, for example, the cleaning command is added between a command for stopping the discharge of the shaping material by controlling the flow rate adjusting unit 70 and a command for restarting the discharge of the shaping material from the position after the movement.

(F2) FIG. 14 is a table showing a relationship between a type of the shaping material and the frequency at which the cleaning process is executed. In each of the embodiments described above, as shown in FIG. 14, the data changing unit 15 may add the cleaning command such that the frequency at which the cleaning process is executed is different depending on the type of the shaping material for shaping the three-dimensional shaped object. For example, in the above-described first embodiment, if the data changing unit 15 changes the first threshold value in accordance with the type of the shaping material designated by a user, the frequency at which the cleaning process is executed can be changed in accordance with the type of the shaping material. In this manner, it is possible to appropriately perform the cleaning on the nozzle 60 in accordance with the shaping material.

Figure 15:
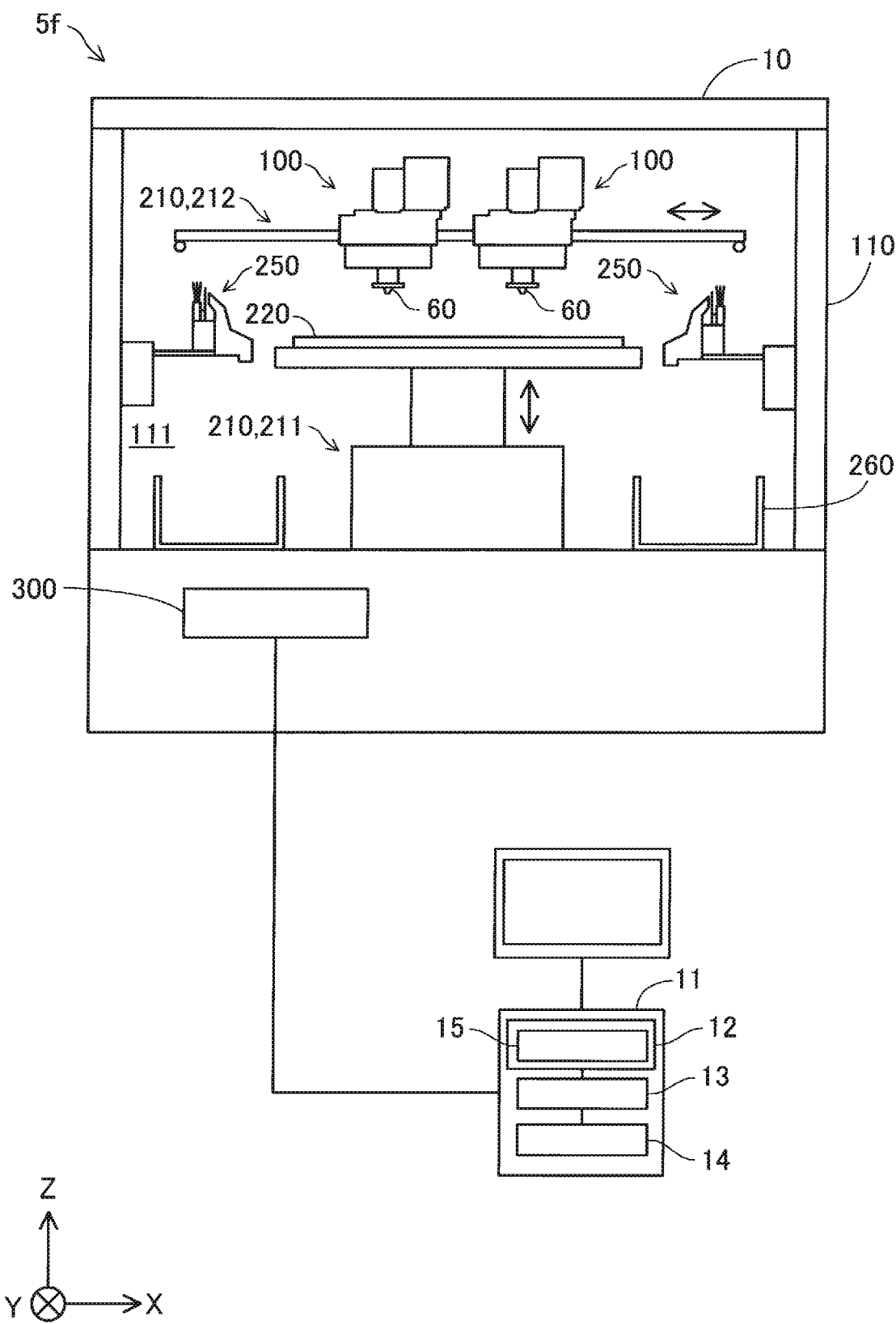
FIG. 15 is an illustrative diagram showing a schematic configuration of a three-dimensional shaping system including two discharge units.

(F3) FIG. 15 is an illustrative diagram showing a schematic configuration of a three-dimensional shaping system 5f including two discharge units 100. In the three-dimensional shaping system 5f, for example, a shaping material for shaping the three-dimensional shaped object is discharged from the nozzle 60 of one discharge unit 100, and a support material for supporting an overhang portion of the three-dimensional shaped object is discharged from the nozzle 60 of the other discharge unit 100. In the above-described first embodiment, the data changing unit 15 adds the cleaning command to the shaping data, so that the cleaning is performed at the timing at which the shaping target is switched from the current layer to the next layer. On the other hand, in the three-dimensional shaping system 5f, the data changing unit 15 may add the cleaning command to the shaping data, so that the cleaning is performed at a timing at which the nozzle 60 used for the layer shaping is switched. In this case, for example, the cleaning command is added between a command for switching the nozzles 60 and a command for performing shaping using the switched nozzle 60. As a target to be cleaned, only the nozzle 60 before the switching, or both the nozzle 60 before the switching and the nozzle 60 after the switching may be cleaned. The shaping material discharged from each of the discharge units 100 may be, for example, a material having a different color or a material having a different material property.

(F4) In the above-described first embodiment, the data changing unit 15 determines a timing of adding the cleaning command by integrating the discharge amounts. On the other hand, the data changing unit 15 may determine the timing of adding the cleaning command by analyzing the shaping data and integrating discharge time of the shaping material, the number of times of the discharge of the shaping material from the nozzle 60, a length of the movement path, the shaping time, and the number of shaped layers. For example, when the number of shaped layers exceeds a threshold value, the cleaning command may be added, so that the cleaning is performed at the timing of the layer switching. When the length of the movement path exceeds a threshold value, the cleaning command may be added, so that the cleaning is performed at the timing at which the nozzle 60 is moved to a distant position in the same layer.

(F5) In the above-described embodiments, the ejection amount is measured by the weight sensor as the discharge state of the shaping material. On the other hand, the discharge state is not limited to the ejection amount, and can be measured by other methods. For example, as the discharge state, a thickness of the shaping material ejected from the nozzle 60 may be measured by using a length measurement sensor or an image sensor. Further, the shaping material may be discharged onto the stage 220, and a line width of the discharged shaping material may be measured as the discharge state by using the length measurement sensor or the image sensor.

(F6) In the above-described embodiments, the number of times of the reciprocating operations of the nozzle 60 on the cleaning mechanism 250 is different among the normal cleaning, the strong cleaning, and the ultrastrong cleaning. On the other hand, when executing the cleaning having different intensities, the control unit 300 may change an amount of the waste material ejected on the purge unit 253 of the cleaning mechanism 250. Further, a rotation speed of the screw 41 and an ejection pressure at the time of ejecting the waste material may be made different.

(F7) In the above-described first embodiment, the data changing unit 15 may select a cleaning command to be added to the shaping data from a plurality of types of cleaning commands having different cleaning intensities, such as a normal cleaning command, a strong cleaning command, and an ultrastrong cleaning command. In this case, for example, the data changing unit 15 selects a cleaning command from the plurality of types of cleaning commands and adds the selected cleaning command, so that the cleaning is performed with an intensity corresponding to the shaping time or the shaping material. According to such an aspect, the three-dimensional shaping device 10 can execute the cleaning with various intensities in accordance with these cleaning commands.

(F8) Which cleaning process is to be executed among the cleaning processes described in the above-described second to fifth embodiments may be designated depending on a cleaning command added to the shaping data by the information processing apparatus 11.

(F9) In the above-described embodiments, the plasticizing mechanism 30 includes the flat screw as the screw 41. On the other hand, the plasticizing mechanism 30 may include an in-line screw. Further, the discharge unit 100 may be capable of discharging the shaping material while moving the nozzle 60 with respect to the stage 220, and for example, various types of discharge units such as an FDM type discharge unit, a binder jet type discharge unit, and an inkjet type discharge unit may be adopted.

(F10) In the above-described embodiments, the ABS resin in the pellet shape is used as the raw material of the shaping material. On the other hand, the three-dimensional shaping device 10 can shape a three-dimensional shaped object by using various materials such as a thermoplastic material, a metal material, and a ceramic material as a main material. Here, the "main material" refers to a material serving as a center component for forming a shape of a three-dimensional shaped object, and refers to a material having a content of 50 wt % or more in the three-dimensional shaped object. The above-described shaping material includes a material obtained by melting the main material alone or a material obtained by melting the main material and a part of components contained in the main material into a paste form.

When the thermoplastic material is used as the main material, the shaping material is generated by plasticizing the material in the plasticizing mechanism 30. For example, the following thermoplastic resin materials can be used as the thermoplastic material.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyether imide, and polyether ether ketone Additives such as a wax, a flame retardant, an antioxidant, and a heat stabilizer may be mixed into the thermoplastic material in addition to a pigment, a metal, and a ceramic. In the plasticizing mechanism 30, the thermoplastic material is converted into a melted state by being plasticized by the rotation of the screw 41 and the heating of the heater 58. The shaping material generated by melting the thermoplastic material is discharged from the nozzle 60 and then cured by a decrease in temperature.

It is desirable that the thermoplastic material is ejected from the nozzle 60 in a state in which the material is heated to a temperature equal to or higher than the glass transition point thereof and is melted completely. For example, a glass transition point of the ABS resin is about 110° C., and it is desirable that the ABS resin is ejected from the nozzle 60 at about 200° C.

In the three-dimensional shaping device 10, for example, the following metal material may be used as the main material instead of the above-described thermoplastic material. In this case, it is desirable that a component to be melted at the time of generating the shaping material is mixed with a powder material obtained by converting the following metal material into a powder, and then the mixture is put into the plasticizing mechanism 30 as the raw material.

Examples of Metal Material

Single metals such as magnesium (Mg), iron (Fe), cobalt (Co), chromium (Cr), aluminum (Al), titanium (Ti), copper (Cu), and nickel (Ni), or an alloy containing one or more of these metals Examples of Alloy Maraging steel, stainless steel, cobalt chrome molybdenum, a titanium alloy, a nickel alloy, an aluminum alloy, a cobalt alloy, and a cobalt chromium alloy In the three-dimensional shaping device 10, a ceramic material may be used as the main material instead of the above-described metal material. As the ceramic material, for example, an oxide ceramic such as silicon dioxide, titanium dioxide, aluminum oxide, and zirconium oxide, and a non-oxide ceramic such as aluminum nitride may be used. When the above-described metal material or ceramic material is used as the main material, the shaping material disposed on the stage 220 may be cured by sintering with, for example, laser irradiation or warm air.

A powder material of the metal material or the ceramic material to be put into the material accommodating unit 20 as the raw material may be a mixed material obtained by mixing a plurality of types of powders including a single metal powder, an alloy powder, and a ceramic material powder. The powder material of the metal material or the ceramic material may be coated with, for example, the thermoplastic resin shown in the above-described example, or a thermoplastic resin other than those in the above-described example. In this case, the thermoplastic resin may be melted to exhibit fluidity in the plasticizing mechanism 30.

For example, the following solvents can be added to the powder material of the metal material or the ceramic material to be put into the material accommodating unit 20 as the raw material. One solvent or a combination of two or more solvents selected from the following solvents may be used.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, isopropyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (for example, tetrabutylammonium acetate); and ionic liquids such as butyl carbitol acetate In addition, for example, the following binders may be added to the powder material of the metal material or the ceramic material to be put into the material accommodating unit 20 as the raw material.

Examples of Binder

An acrylic resin, an epoxy resin, a silicone resin, a cellulose-based resin or other synthetic resins, or polylactic acid (PLA), polyamide (PA), polyphenylene sulfide (PPS), polyether ether ketone (PEEK) or other thermoplastic resins G. Other Aspects The present disclosure is not limited to the embodiments described above, and can be implemented in various forms without departing from the scope of the present disclosure. For example, technical features of the embodiments corresponding to technical features of the embodiments described below can be appropriately replaced or combined in order to solve a part or all of the above problems or to achieve a part or all of the above effects. Further, when the technical features are not described as essential in the present description, the technical features can be appropriately deleted.

(1) According to a first aspect of the present disclosure, a method for manufacturing a three-dimensional shaped object is provided. The method for manufacturing a three-dimensional shaped object including: a stacking step of stacking a layer by discharging a shaping material from a nozzle while moving the nozzle with respect to a stage in accordance with shaping data with which a three-dimensional shaped object is shaped, the shaping data including path information indicating a movement path of the nozzle with respect to the stage and discharge amount information indicating a discharge amount of the shaping material in the movement path; and a data changing step of adding a cleaning command for cleaning the nozzle to the shaping data based on information included in the shaping data.

According to such an aspect, the cleaning command for executing the cleaning in accordance with the information included in the shaping data can be added to the shaping data, and thus, for example, it is possible to prevent the cleaning process from being unintentionally executed during the layer shaping. As a result, it is possible to reduce a possibility that the cleaning process affects the shaping accuracy of the three-dimensional shaped object.

(2) According to the above aspect, in the data changing step, the cleaning command selected from a plurality of types of the cleaning commands having different cleaning intensities may be added to the shaping data. According to such an aspect, the cleaning can be executed with various intensities.

(3) According to the above aspect, in the data changing step, the cleaning command may be added to the shaping data, so that cleaning is performed at a timing at which a layer of a shaping target is switched. According to such an aspect, it is possible to reduce a possibility that the cleaning process affects the shaping accuracy of the three-dimensional shaped object.

(4) According to the above aspect, in the data changing step, the cleaning command may be added to the shaping data, so that cleaning is performed at a timing at which the nozzle used for shaping the layer is switched. According to such an aspect, it is possible to reduce a possibility that the cleaning process affects the shaping accuracy of the three-dimensional shaped object.

(5) According to the above aspect, in the data changing step, the cleaning command may be added to the shaping data, so that cleaning is performed at a timing at which the nozzle is moved to a distant position in the layer with respect to the stage. According to such an aspect, it is possible to reduce a possibility that the cleaning process affects the shaping accuracy of the three-dimensional shaped object.

(6) According to the above aspect, in the data changing step, a timing of adding the cleaning command may be determined according to at least one of a discharge amount of the shaping material, a discharge time of the shaping material, the number of times of the discharge of the shaping material from the nozzle, a length of the movement path, the number of the shaped layers, and a shaping time.

(7) According to the above aspect, in the data changing step, the cleaning command may be added to the shaping data, so that a frequency at which cleaning is executed increases as the shaping time elapses. According to such an aspect, it is possible to improve cleanliness of the nozzle.

(8) According to the above aspect, in the data changing step, the cleaning command may be added to the shaping data, so that a frequency at which cleaning is executed changes in accordance with the shaping material. According to such an aspect, it is possible to appropriately perform the cleaning on the nozzle in accordance with the shaping material.

(9) According to the above aspect, the method may further include: a measuring step of measuring a discharge state of the nozzle after cleaning is performed in accordance with the cleaning command. According to such an aspect, it is possible to confirm whether the nozzle is cleaned by the cleaning.

(10) According to the above aspect, the method may further include: a step of performing cleaning in which an intensity of cleaning is improved when the discharge state measured in the measuring step does not reach a predetermined discharge state. According to such an aspect, it is possible to improve the cleanliness of the nozzle.

(11) According to a second aspect of the present disclosure, a three-dimensional shaping system including a three-dimensional shaping device and an information processing apparatus is provided. In the three-dimensional shaping system, the three-dimensional shaping device includes a discharge unit configured to discharge a shaping material from a nozzle while moving the nozzle with respect to a stage in accordance with shaping data with which a three-dimensional shaped object is shaped, so as to stack a layer. The shaping data includes path information indicating a movement path of the nozzle with respect to the stage and discharge amount information indicating a discharge amount of the shaping material in the movement path. The information processing apparatus includes a data changing unit configured to add a cleaning command for cleaning the nozzle to the shaping data based on information included in the shaping data.

(12) According to a third aspect of the present disclosure, an information processing apparatus is provided. The information processing apparatus is configured to supply shaping data to a three-dimensional shaping device configured to stack a layer by discharging a shaping material from a nozzle while moving the nozzle with respect to a stage in accordance with the shaping data with which a three-dimensional shaped object is shaped. The shaping data includes path information indicating a movement path of the nozzle with respect to the stage and discharge amount information indicating a discharge amount of the shaping material in the movement path. The information processing apparatus includes a data changing unit configured to add a cleaning command for cleaning the nozzle to the shaping data based on data included in the shaping data.

What is claimed is:

1. A method for manufacturing a three-dimensional shaped object, comprising:
   a stacking step of stacking a layer by discharging a shaping material from a nozzle while moving the nozzle with respect to a stage in accordance with shaping data with which a three-dimensional shaped object is shaped, the shaping data including path information indicating a movement path of the nozzle with respect to the stage and discharge amount information indicating a discharge amount of the shaping material in the movement path; and
   a data changing step of adding a cleaning command for cleaning the nozzle to the shaping data based on information included in the shaping data,
   wherein
   a timing of adding the cleaning command is determined according to at least one of the discharge amount of the shaping material, a discharge time of the shaping material, a number of times of the discharge of the shaping material from the nozzle, a length of the movement path, a number of the shaped layers, and a shaping time and,
   when the timing of adding the cleaning command is determined according to the discharge amount of the shaping material, adding the cleaning command to the shaping data based on an integrated discharge amount that is based on the discharge amount information corresponding to the movement path, and then resetting the integrated discharge amount.

2. The method for manufacturing a three-dimensional shaped object according to claim 1, wherein
   in the data changing step, the cleaning command selected from a plurality of types of the cleaning commands having different cleaning intensities is added to the shaping data.

3. The method for manufacturing a three-dimensional shaped object according to claim 1, wherein
   in the data changing step, the cleaning command is added to the shaping data, so that cleaning is performed at a timing at which a layer of a shaping target is switched.

4. The method for manufacturing a three-dimensional shaped object according to claim 1, wherein
   in the data changing step, the cleaning command is added to the shaping data, so that cleaning is performed at a timing at which the nozzle used for shaping the layer is switched.

5. The method for manufacturing a three-dimensional shaped object according to claim 1, wherein
   in the data changing step, the cleaning command is added to the shaping data, so that cleaning is performed at a timing at which the nozzle is moved to a distant position in the layer with respect to the stage.

6. The method for manufacturing a three-dimensional shaped object according to claim 5, wherein the shaping data includes a stop command that controls a flow rate adjusting unit to stop discharging the shaping material from the nozzle, and a restart command that controls the flow rate adjusting unit to restart discharging the shaping material from the nozzle, adding the cleaning command to shaping data between the stop command and the restart command, the flow rate adjusting unit disposed in a flow path upstream of the nozzle and having a valve that rotates within the flow path.

7. The method for manufacturing a three-dimensional shaped object according to claim 1, wherein
   in the data changing step, the cleaning command is added to the shaping data, so that a frequency at which cleaning is executed increases as shaping time elapses.

8. The method for manufacturing a three-dimensional shaped object according to claim 1, wherein
   in the data changing step, the cleaning command is added to the shaping data, so that a frequency at which cleaning is executed changes in accordance with the shaping material.

9. The method for manufacturing a three-dimensional shaped object according to claim 1, further comprising:
   a measuring step of measuring a discharge state of the nozzle after cleaning is performed in accordance with the cleaning command.

10. The method for manufacturing a three-dimensional shaped object according to claim 9, further comprising:
    a step of performing cleaning in which an intensity of cleaning is changed when the discharge state measured in the measuring step does not reach a predetermined discharge state.

11. The method for manufacturing a three-dimensional shaped object according to claim 1, further comprising a step of executing a cleaning process according to the cleaning command, in the step of executing the cleaning process, before cleaning the nozzle, measuring an discharge amount of the shaping material from the nozzle, and determining whether or not the discharge amount is within the reference range, end the cleaning process when the discharge amount is within the reference range, perform cleaning the nozzle when the discharge amount is outside the reference range.

12. The method for manufacturing a three-dimensional shaped object according to claim 1, wherein when the timing of adding the cleaning command is determined according to the discharge amount of the shaping material, adding the cleaning command to shaping data when the integrated discharge amount exceeds a first threshold value.

13. The method for manufacturing a three-dimensional shaped object according to claim 12, the first threshold value becomes smaller as the shaping time becomes longer.

14. A three-dimensional shaping system comprising: a three-dimensional shaping device; and an information processing apparatus, wherein
    the three-dimensional shaping device includes
       a discharge unit configured to discharge a shaping material from a nozzle while moving the nozzle with respect to a stage in accordance with shaping data with which a three-dimensional shaped object is shaped, so as to stack a layer, the shaping data including path information indicating a movement path of the nozzle with respect to the stage and discharge amount information indicating a discharge amount of the shaping material in the movement path, and
    the information processing apparatus includes
       a data changing unit configured to add a cleaning command for cleaning the nozzle to the shaping data based on information included in the shaping data and resetting an integrated discharge amount that is based upon the discharge amount information corresponding to the movement path, wherein
       the data changing unit is configured to determine a timing of adding the cleaning command according to at least one of a discharge time of the shaping material, a number of times of the discharge of the shaping material from the nozzle, a length of the movement path, a number of the shaped layers, and a shaping time.

15. An information processing apparatus configured to supply shaping data to a three-dimensional shaping device configured to stack a layer by discharging a shaping material from a nozzle while moving the nozzle with respect to a stage in accordance with the shaping data with which a three-dimensional shaped object is shaped, the shaping data including path information indicating a movement path of the nozzle with respect to the stage and discharge amount information indicating a discharge amount of the shaping material in the movement path, the information processing apparatus comprising:

a data changing unit configured to add a cleaning command for cleaning the nozzle to the shaping data based on data included in the shaping data and resetting an integrated discharge amount that is based upon the discharge amount information corresponding to the movement path, wherein the data changing unit is configured to determine a timing of adding the cleaning command according to at least one of a discharge time of the shaping material, a number of times of the discharge of the shaping material from the nozzle, a length of the movement path, a number of the shaped layers, and a shaping time.

* * * * *